March 12, 1957

L. SCHOFFEL 2,784,729

VALVE DEVICE FOR INDEPENDENT PRESSURE
CONTROL OF PLURAL OUTLET BORES

Filed Feb. 24, 1953

3 Sheets-Sheet 1

United States Patent Office 2,784,729
Patented Mar. 12, 1957

2,784,729

VALVE DEVICE FOR INDEPENDENT PRESSURE CONTROL OF PLURAL OUTLET BORES

Ludwig Schoffel, Mannheim-Neuostheim, Germany

Application February 24, 1953, Serial No. 338,508

Claims priority, application Germany February 24, 1952

3 Claims. (Cl. 137—115)

This invention concerns single-roll machines and relates to a hydraulic control system for the friction bar of said machines. Hydraulic pressure adjustment devices for rolling, mixing and grinding machines are known per se but have so far not proved themselves in practice.

The invention relates to a hydraulic control system for the bar of single-roll machines.

According to the present invention there is provided a hydraulic control system for single-roll machines, including branch pipes through which pressure medium may be supplied to various pressure points by a pump and control members for each pipe by which the individual pressures can be individually adjusted independently of the supply pressure of the pump.

The invention makes it possible for example to adjust the application pressure of the bar towards the roll or the front wall of the funnel independently of one another, more particularly it is possible to maintain the application pressure towards the front wall of the funnel independent of the pressure in the direction of the roll at a sufficiently high level to ensure sealing. The application pressure towards the roll may also be adjusted independently of the sealing pressure during the operation of the machine, according to requirements. The excess pressure valve connected in front of the two regulating valves ensures that a constant supply pressure from the pump s maintained and prevents an unallowable increase in pressure in the pressure medium system. The pump may therefore be operated with an ever-constant supply pressure, thus making it possible to do without special regulating members for the pump drive.

Figure 1:
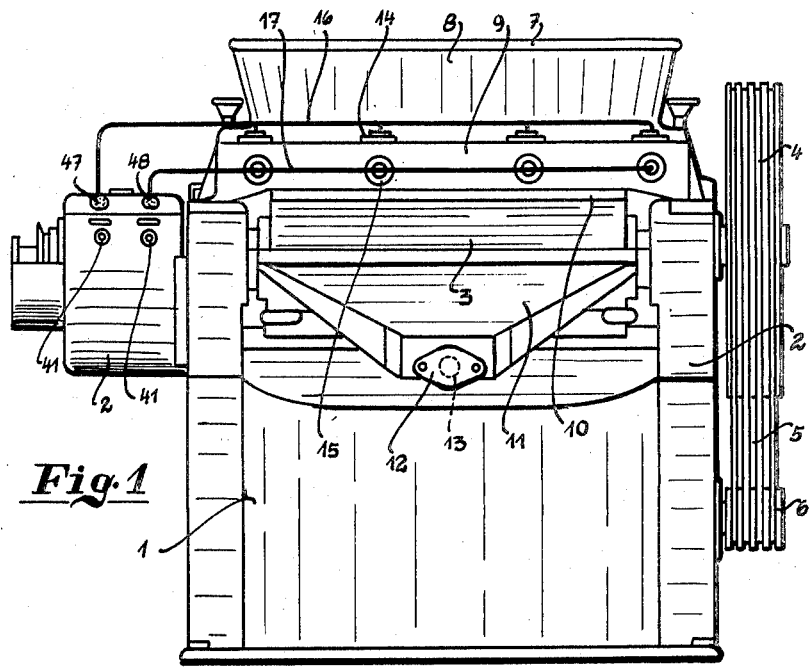
Figure 2:
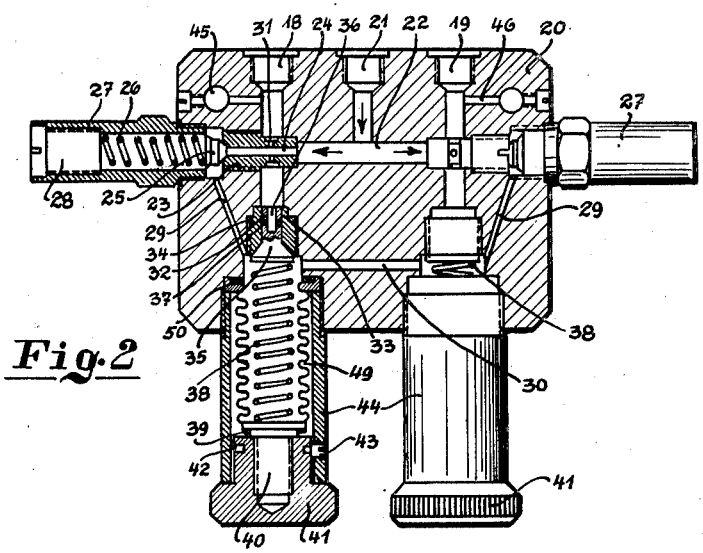
Figure 3:
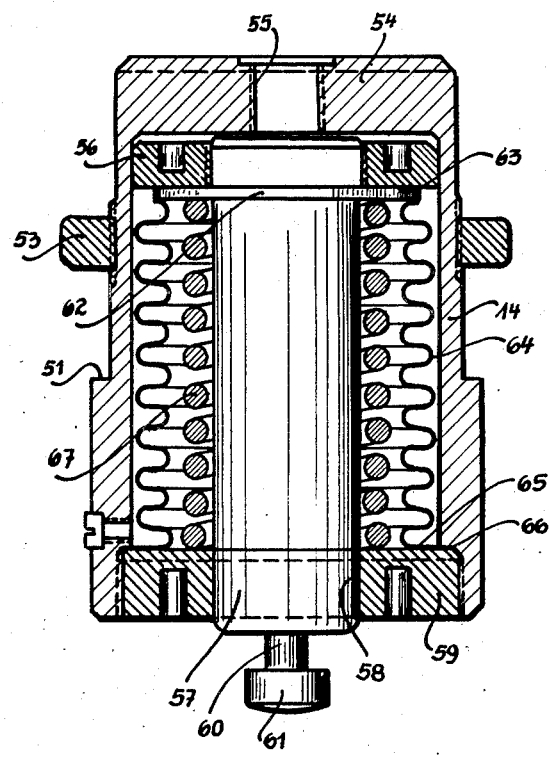
Figure 4:
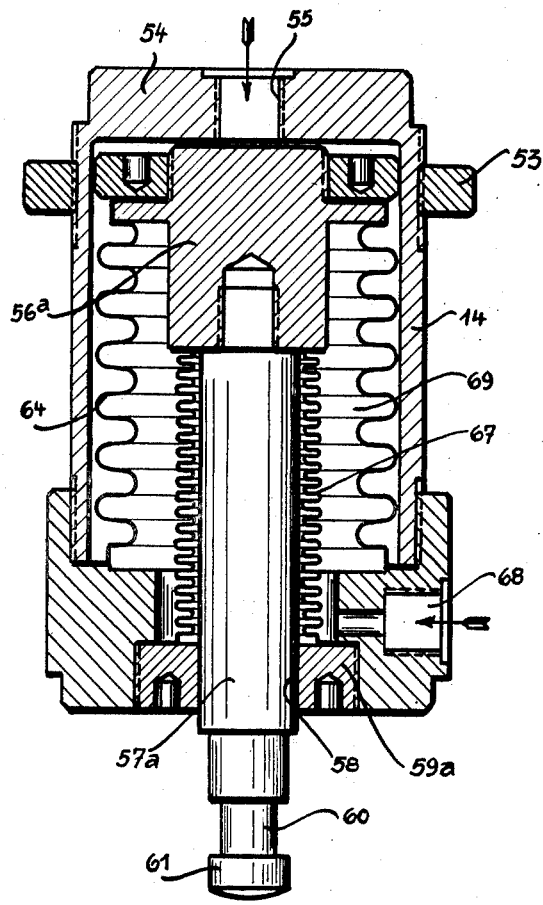

For a better understanding of the invention, reference will now be made to the accompanying drawings in which Figure 1 is a front elevation of a single-roll machine having a control of the invention, Figure 2 is a sectional view of the control housing, Figure 3 is a sectional view of a control cylinder, and Figure 4 is a sectional view of a modified control cylinder.

Referring now to Fig. 1 of the drawings, the single-roll machine is constructed in an otherwise known manner and consists substantially of a roll 3 rotatably mounted on bearings 2 of the machine casing 1, said roll being driven through gearing 4, 5, 6 by a motor arranged within the machine casing. The machine casing 1 carries above the roll 3, and bearing on the said roll a supply funnel 7 whose front wall 8 has a guide 9 for the friction bar 10. The material to be treated is taken from the roll 3 by a removal tray 11 and led away to a collecting vessel through an outlet 13 which may be closed by a push-member 12.

In the upper side and the front side of the guide there are disposed a series of cylinders 14, 15, which are connected to pressure pipes 16, 17. Each cylinder 14, which is secured in the bar traverse 9 between a shoulder 51 and a screw ring 53, has at its end 54 a screw bore 55 for connection to the pressure medium pipe 16. The cylinder 14 contains a piston disc 56, which is screwed on to a piston rod 57. The piston rod 57 passes through a bore 58 of a disc 59 which seals the lower end of the cylinder 14 and carries on a neck 60 a head 61 on which the bar 10 is disposed.

The piston disc 56 bears on an end-ring 62 of the rod 57. Between the end-ring 62 and the disc 56 is clamped the indrawn end 63 of a bellows 64, the other end 65 of which is outwardly turned and is secured between a shoulder 66 of the cylinder 14 and the sealing disc 59. The pressure medium can therefore only strike up against the piston disc 56 and at most fill the space between the cylinder wall and the bellows 64. It is however not possible for the pressure medium to pass out of the spaces which it has filled. More particularly, the pressure medium cannot reach the portion where the rod 57 slides within the sealing disc 59, which means that special sealing measures are not necessary.

In the bellows 64 a pressure spring 67 is arranged about the rod 57, the said pressure spring bearing against the end-ring 62 and the sealing disc 59. This pressure spring 67 ensures the return of the rod 57, on which the bar is disposed, to the starting position when pressure is removed from the disc 56.

The pressure cylinders 15 having the same construction as the pressure cylinders 14, except that the head of the piston rod bears only against the bar.

The two pipes 16, 17 are connected to bores 18, 19 of a control housing 20 (Fig. 2) which is arranged in or on the one drive-box 2. The pressure medium is supplied to the housing 20 by a supply pump which is in constant operation and the pressure pipe of which is connected to the bore 21 of the housing 20. The bore 21 leads to a transverse bore 22 from which the bores 18 and 19 branch off. In the region of the bores 18, 19 bushes 23 are inserted into the bore 22, the passage 24 of the said bushes being closed at the outer end by the valve discs 25. The valve discs 25 are put under tension by springs 26 which are contained in bushes 27 screwed into the mouth of the transverse bore 22 and can be adjusted by screw stops 28 arranged in the said bushes. By adjusting the tension of the springs 26 by means of the screw stops 28 a specific maximum pressure can be produced in the transverse bore 22. The pressure medium escaping over the valve disc 25 is led through channels 29 to a passage 30 which is connected to a return pipe.

The bushes 23 have a transverse throttling bore 31 which forms the connection to the bores 18, 19. These bores 18, 19 extend as far as the return bore 30 and just before they join the said return bore they are provided with a bush 32 in the bore 33 of which the stem 34 of a valve disc 35 is disposed. The stem 34 has a sack-shaped bore 36 from which there passes out a transverse bore 37, and therefore in a specific position allows the outflow of the pressure medium from the bore 18 or 19 to the return bore 30.

Each valve disc 35 is put under pressure by a spring 38 the other end of which bears on the head 39 of a screw plug 40. The screw plugs 40 are each contained by internally threaded adjustment buttons 41. Securing screws 43 engaging in an annular groove 42 hold the adjustment buttons 41 in bushes 44 so as to be rotatable but not displaceable. When the adjustment button is rotated the screw plug 40 is screwed out or into the said adjustment button according to the direction of rotation, so that the tension of the valve disc 35 may be regulated thereby. The loaded springs 38 prevent the screw plugs 40 from rotating with the adjustment buttons 41.

It is therefore possible to adjust the springs 38 independently of each other, so that the two valve discs 35 will open at different pressures.

Since the maximum pressure obtainable in channel 22 is determined by the adjustment of the one of the springs 26 which is under the smaller compression, the disclosed device will operate satisfactorily with only a single valve 25 associated with the channel 22. However, since the channel 22 communicates with the bores 18 and 19 through the throttling or restricted bores 31, different pressures can be obtained in the bores 18 and 19, and hence in the respective pipes 16 and 17, by providing different adjustments for the two springs 38.

Therefore for each bore 18, 19 a specific pressure can be set, the maximum pressure being determined by the adjustment of the valves 25.

Each of the bores 18, 19 is connected by a passage 45, 46 to a pressure indicator 47, 48.

From one point, therefore, the main pressure in the control system and the pressure in the control pipes 16, 17 can be adjusted as desired independently of one another, the bar at once responding to each adjustment under the effect of the return springs which put the pressure pistons under tension.

In order to prevent as much as possible any fall in pressure due to liquid leakage, the pressure springs 38 in the bushes 44 are arranged inside metal bellows 49, which are at one end thereof secured to the screw plugs 40 and at the other end are gripped between packings 50 held by the bushes 44.

According to Fig. 4 a second bellows 67 is provided around the rod 57a so that a space 69 is left between the two bellows 49 and 67 to which space fluid pressure made be applied by opening 68 for return movement of the rod 57a.

I claim:

1. A device for controlling the pressure of fluid fed to a plurality of conduits; said device comprising a body having a channel therein, an inlet passage for pressure fluid opening into said channel, at least one pressure relief valve in said channel to determine the maximum pressure of the fluid in the latter, a plurality of outlet bores transversely intersecting said channel for feeding pressure fluid from the latter to a related conduit, a bushing in said channel at each intersection of the latter with said outlet bores and having a restricted throttling bore extending transversely therethrough to open into the related outlet bore, and an individually adjustable pressure relief valve means in each of said outlet bores to independently determine the pressure in the related one of said outlet bores.

2. A device according to claim 1; wherein said body further has a pressure fluid return passage intersecting said outlet bores, and said individually adjustable pressure relief valve means includes a valve seat bushing in the related outlet bore between said return passage and said channel, a valve member reciprocatable in said bushing and having a central recess opening in the direction toward said channel and at least one radial passage extending from said central recess, spring means yieldably urging said valve member into the related bushing to a position in which said radial passage is closed by the bushing so that, when the pressure in the outlet bore becomes sufficient to overcome the force of said spring means, the valve member is axially displaced to uncover said radial passage and communicate said outlet bore with said return passage, and means for varying the force exerted by said spring means against said valve member.

3. A device according to claim 2; wherein said spring means includes a helical spring abutting axially against said valve member, and said means for varying the force exerted by said spring means includes a sleeve extending from said body co-axially with the related outlet bore, an adjusting knob rotatably mounted on the outer end of said sleeve and having an axial threaded bore, and an adjustable spring abutment bearing axially against said spring and having a threaded stem received in said threaded bore so that rotation of said knob effects axial movement of said spring abutment to vary the compression of said helical spring.

References Cited in the file of this patent
UNITED STATES PATENTS

| | | |
|---|---|---|
| 2,051,434 | Cavagnaro | Aug. 18, 1936 |
| 2,286,620 | Hollengreen | June 16, 1942 |
| 2,312,726 | Munro | Mar. 2, 1943 |
| 2,545,921 | Goodwillie et al. | Mar. 20, 1951 |
| 2,554,659 | Branson | May 29, 1951 |
| 2,636,509 | Cizek | Apr. 28, 1953 |
| 2,652,859 | Murphy | Sept. 22, 1953 |
| 2,659,206 | Carlson | Nov. 17, 1953 |